(12) United States Patent
Schneider et al.

(10) Patent No.: US 9,124,472 B1
(45) Date of Patent: Sep. 1, 2015

(54) PROVIDING FILE INFORMATION TO A CLIENT RESPONSIVE TO A FILE DOWNLOAD STABILITY PREDICTION

(75) Inventors: Scott Schneider, Santa Monica, CA (US); Jeffrey Wilhelm, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 350 days.

(21) Appl. No.: 13/558,177

(22) Filed: Jul. 25, 2012

(51) Int. Cl.
G06F 13/00 (2006.01)
H04L 29/08 (2006.01)

(52) U.S. Cl.
CPC ................................ *H04L 29/08072* (2013.01)

(58) Field of Classification Search
CPC .............. H04L 29/08072; H04L 29/06; H04L 29/0809; H04L 29/08981; G06Q 30/02
USPC ........................................................ 709/217
See application file for complete search history.

(56) References Cited

U.S. PATENT DOCUMENTS

| 6,233,606 | B1 * | 5/2001 | Dujari ........................... 709/213 |
| 6,347,332 | B1 | 2/2002 | Malet et al. |
| 6,556,989 | B1 | 4/2003 | Naimark et al. |
| 7,197,539 | B1 | 3/2007 | Cooley |
| 7,272,719 | B2 | 9/2007 | Bleckmann et al. |
| 7,281,270 | B2 | 10/2007 | Piesco et al. |
| 7,412,516 | B1 | 8/2008 | Brown et al. |
| 7,448,084 | B1 | 11/2008 | Apap et al. |
| 7,472,420 | B1 | 12/2008 | Pavlyushchik |
| 7,546,349 | B1 | 6/2009 | Cooley |
| 7,562,304 | B2 | 7/2009 | Dixon et al. |
| 7,565,358 | B2 | 7/2009 | Minogue et al. |
| 7,587,367 | B2 | 9/2009 | Mengerink |
| 7,668,951 | B2 | 2/2010 | Lund et al. |
| 7,783,741 | B2 | 8/2010 | Hardt |
| 7,854,007 | B2 | 12/2010 | Sprosts et al. |
| 7,870,608 | B2 | 1/2011 | Shraim et al. |
| 7,941,853 | B2 | 5/2011 | Rozenberg et al. |

(Continued)

FOREIGN PATENT DOCUMENTS

WO WO 2009/076555 A2 6/2009

OTHER PUBLICATIONS

Archive of "Abaca Products > Filtering Technology," www.abaca.com, [Online] [Archived by http://archive.org on Oct. 24, 2006; Retrieved on Apr. 11, 2013] Retrieved from the Internet<URL:http://web.archive.org/web/20061024023812/http://www.abaca.com/producttechnology.html>.

(Continued)

*Primary Examiner* — Robert B Harrell
(74) *Attorney, Agent, or Firm* — Fenwick & West LLP (57) ABSTRACT

A client sends a file information request to a security server, where the file information request identifies a URL from which the client is attempting to download a file. Upon receiving the request, the security server determines the stability information of the identified URL and provides the requested file information for the file provided by the URL. The security server determines the stability information of a URL by analyzing the file identifiers and URLs identified in downloaded file reports received from multiple clients. The determination of the stability information of a URL may be based on a variety of factors, such as stability of a URL over time, a textual analysis of the URL, and the set of files provided by the URL. A user of the client can review the file information and decide whether to expend the resources to download the file.

17 Claims, 4 Drawing Sheets

(56) References Cited

U.S. PATENT DOCUMENTS

| | | |
|---|---|---|
| 8,001,606 B1 | 8/2011 | Spertus |
| 8,019,689 B1 | 9/2011 | Nachenberg |
| 8,065,731 B1 | 11/2011 | Nucci et al. |
| 8,200,587 B2 | 6/2012 | Deyo |
| 8,250,657 B1 | 8/2012 | Nachenberg et al. |
| 8,312,536 B2 | 11/2012 | Nachenberg et al. |
| 8,327,131 B1 | 12/2012 | Hardjono et al. |
| 8,341,745 B1 | 12/2012 | Chau et al. |
| 8,381,289 B1 | 2/2013 | Pereira et al. |
| 8,392,997 B2 | 3/2013 | Chen et al. |
| 8,413,251 B1 | 4/2013 | Gibney et al. |
| 2002/0046041 A1 | 4/2002 | Lang |
| 2002/0156668 A1 | 10/2002 | Morrow et al. |
| 2003/0167308 A1 | 9/2003 | Schran |
| 2004/0054661 A1 | 3/2004 | Cheung |
| 2004/0138965 A1 | 7/2004 | Laughlin et al. |
| 2005/0050335 A1 | 3/2005 | Liang et al. |
| 2005/0268090 A1 | 12/2005 | Saw et al. |
| 2005/0283837 A1 | 12/2005 | Olivier et al. |
| 2006/0026123 A1 | 2/2006 | Moore et al. |
| 2006/0085328 A1 | 4/2006 | Cohen et al. |
| 2006/0212270 A1 | 9/2006 | Shiu et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0218642 A1 | 9/2006 | Kuppusamy et al. |
| 2006/0230039 A1 | 10/2006 | Shull et al. |
| 2006/0253458 A1 | 11/2006 | Dixon et al. |
| 2006/0253581 A1 | 11/2006 | Dixon et al. |
| 2006/0253583 A1 | 11/2006 | Dixon et al. |
| 2006/0253584 A1 | 11/2006 | Dixon et al. |
| 2007/0011739 A1 | 1/2007 | Zamir et al. |
| 2007/0016953 A1 | 1/2007 | Morris et al. |
| 2007/0050444 A1 | 3/2007 | Costea et al. |
| 2007/0067843 A1 | 3/2007 | Williamson et al. |
| 2007/0094734 A1 | 4/2007 | Mangione-Smith et al. |
| 2007/0107053 A1 | 5/2007 | Shraim et al. |
| 2007/0124579 A1 | 5/2007 | Haller |
| 2007/0143629 A1 | 6/2007 | Hardjono et al. |
| 2007/0156886 A1 | 7/2007 | Srivastava |
| 2007/0162349 A1 | 7/2007 | Silver |
| 2007/0192855 A1 | 8/2007 | Hulten et al. |
| 2007/0233782 A1 | 10/2007 | Tali |
| 2007/0240222 A1 | 10/2007 | Tuvell et al. |
| 2008/0005223 A1 | 1/2008 | Flake et al. |
| 2008/0028463 A1 | 1/2008 | Dagon et al. |
| 2008/0077994 A1 | 3/2008 | Comlekoglu |
| 2008/0082628 A1 | 4/2008 | Rowstron et al. |
| 2008/0082662 A1 | 4/2008 | Dandliker et al. |
| 2008/0104180 A1 | 5/2008 | Gabe |
| 2008/0109244 A1 | 5/2008 | Gupta |
| 2008/0109473 A1 | 5/2008 | Dixon et al. |
| 2008/0109491 A1 | 5/2008 | Gupta |
| 2008/0114709 A1 | 5/2008 | Dixon et al. |
| 2008/0133540 A1 | 6/2008 | Hubbard et al. |
| 2008/0133972 A1 | 6/2008 | Verbowski et al. |
| 2008/0137864 A1 | 6/2008 | Jin et al. |
| 2008/0140442 A1 | 6/2008 | Warner |
| 2008/0140820 A1 | 6/2008 | Snyder et al. |
| 2008/0141366 A1 | 6/2008 | Cross et al. |
| 2008/0189788 A1 | 8/2008 | Bahl |
| 2008/0222726 A1 | 9/2008 | Chayes et al. |
| 2008/0255977 A1 | 10/2008 | Altberg et al. |
| 2008/0263677 A1 | 10/2008 | Kaditz et al. |
| 2009/0125382 A1 | 5/2009 | Delepet |
| 2009/0254993 A1 | 10/2009 | Leone |
| 2009/0282476 A1 | 11/2009 | Nachenberg et al. |
| 2009/0328209 A1 | 12/2009 | Nachenberg |
| 2010/0005291 A1 | 1/2010 | Hulten et al. |
| 2010/0153354 A1 | 6/2010 | Buccella et al. |
| 2010/0169970 A1 | 7/2010 | Stolfo et al. |
| 2010/0211997 A1 | 8/2010 | McGeehan et al. |
| 2011/0040825 A1 | 2/2011 | Ramzan et al. |
| 2011/0055923 A1 | 3/2011 | Thomas |
| 2011/0067101 A1 | 3/2011 | Seshadri et al. |
| 2011/0225655 A1 | 9/2011 | Niemela et al. |
| 2012/0197656 A1 | 8/2012 | Lang et al. |
| 2012/0278264 A1 | 11/2012 | Deyo |

OTHER PUBLICATIONS

Aringhieri, R. et al., "Fuzzy Techniques for Trust and Reputation Management in Anonymous Peer-to-Peer Systems," Journal of the American Society for Information Science and Technology, 2006, pp. 528-537, vol. 57, No. 4, accessed Jan. 15, 2013 at <http://onlinelibrary.wiley.com/doil1 0.1 002/asi.20307/pdf>.

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," In Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," 4th Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the 15th ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

(56) References Cited

OTHER PUBLICATIONS

Siddiqui, M. et al., "A Survey of Data Mining Techniques for Malware Detection Using File Features," ACM-SE 46: Proceedings of the 46$^{th}$ Annual Southeast Regional Conference on XX, ACM, 2008, pp. 509-510, New York, N.Y.
Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04_2008.en-us.pdf>.
Symantec Malware Definition, [Online] [Retrieved on Aug. 6, 2010] Retrieved from the Internet<URL:http://www.symantec.com./norton/security_response/malware.jsp>.
Symantec Norton Community Watch Privacy Policy, [Online] [Retrieved on Aug. 6, 2010] Retrieved from the Internet<URL:http://www.symantec.com/about/profile/policies/ncwprivacy.jsp>.
Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.
Tesauro, G. et al., "Neural Networks for Computer Virus Recognition," IEEE Expert, 1996, pp. 5-6, vol. 11, No. 4.
Tong, H. et al., "Fast Best-Effort Pattern Matching in Large Attributed Graphs," Proceedings of the 13$^{th}$ ACM SIGKDD International Conference on Knowledge Discovery and Data Mining, ACM, 2007, 10 pages.
U.S. Appl. No. 12/059,258, filed Mar. 31, 2008, Inventors Sourabh Satish et al.
U.S. Appl. No. 12/059,271, filed Mar. 31, 2008, Inventors Brian Hernacki et al.
U.S. Appl. No. 12/165,599, filed Jun. 30, 2008, Inventor Carey S. Nachenberg.
U.S. Appl. No. 12/242,634, filed Sep. 30, 2008, Inventors Josephine Gibney et al.
U.S. Appl. No. 12/407,772, filed Mar. 19, 2009, Inventors Carey S. Nachenberg et al.
U.S. Appl. No. 12/416,020, filed Mar. 31, 2009, Inventors Shane Pereira et al.
U.S. Appl. No. 12/831,004, filed Jul. 6, 2010, Inventors Carey S. Nachenberg et al.
U.S. Appl. No. 13/556,401, filed Jul. 24, 2012, Inventors Carey S. Nachenberg et al.
U.S. Appl. No. 13/677,914, filed Nov. 15, 2012, Inventors Duen Hong Chau et al.
U.S. Appl. No. 13/666,788, filed Nov. 1, 2012, Inventors Carey S. Nachenberg et al.
Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.
Weaver, N. et al., "A Taxonomy of Computer Worms," Proceedings of the 2003 ACM Workshop on Rapid Malcode, ACM, 2003, pp. 11-18, New York, N.Y.
Xie, Y. et al., "Innocent by Association: Early Recognition of Legitimate Users," Oct. 16-18, 2012, CCS '12: Proceedings of the 2012 ACM Conference on Computer and Communications Security, pp. 353-364.
Yan, X. et al., "gSpan: Graph-Based Substructure Pattern Mining," Proceedings of the 2002 IEEE International Conference on Data Mining (ICDM '02), 2002, 4 pages.
Yan, X. et al., "Mining Closed Relational Graphs with Connectivity Constraints," Proceedings of the Eleventh ACM SIGKDD International Conference on Knowledge Discovery in Data Mining, ACM, 2005, p. 333.
Yedidia, J. et al., "Understanding Belief Propagation and Its Generalizations," Exploring Artificial Intelligence in the New Millennium, 2003, pp. 236-239, vol. 8.
Zeng, Z. et al., "Coherent Closed Quasi-Clique Discovery from Large Dense Graph Databases," Proceedings of the 12$^{th}$ ACM SIGKDD International Conference on Knowledge Discovery and Data Mining, ACM, 2006, 6 pages.
Zhu, X., "Semi-Supervised Learning with Graphs," 2005, 174 pages.
White, R., "How Computers Work," Que, Oct. 2003, 44 pages.
Colvin, R., Program Manager, SmartScreen, "Stranger Danger"—Introducing SmartScreen® Application Reputation, Oct. 13, 2010, pp. 1-9, can be retrieved at <http://blogs.msdn.com/b/ie/archive/2010/10/13/stranger-danger-introducing-smartscreen-application-reputation.aspx>.
Trend Micro™, "Outthink the Threat," A Trend Micro eBook, 2008, pp. 1-17, can be retrieved at <http://uk.trendmicro.com/imperia/md/content/campaigns/thinkagain/thinkagain_ebook.pdf>.

\* cited by examiner

PROVIDING FILE INFORMATION TO A CLIENT RESPONSIVE TO A FILE DOWNLOAD STABILITY PREDICTION

BACKGROUND OF THE INVENTION

1. Field of the Invention

This invention pertains in general to computer security and in particular to predicting characteristics of a computer file prior to downloading the file.

2. Description of the Related Art

Users of modern electronic devices face a wide variety of threats. For example, innocent-looking websites can surreptitiously hide malicious software (malware) such as computer viruses, worms, Trojan horse programs, spyware, adware, and crimeware in files downloaded from the websites. The malware can capture important information such as logins, passwords, bank account identifiers, and credit card numbers. Similarly, malware can provide hidden interfaces that allow the attacker to access and control the compromised device, or that cause the compromised device to malfunction.

Given these potential threats, a user may rely on security software to protect the electronic device. When the user downloads a computer file to the electronic device, the security software scans the file and evaluates whether it is malicious. The security software thus prevents the user from executing or otherwise interacting with files that may attack the electronic device. However, the user still must expend resources including time and bandwidth to download the file before the security software can evaluate it. These resources are essentially wasted if the file turns out to be malicious.

SUMMARY

The above and other needs are met by methods, computer-readable storage media, and systems for providing file information to a client prior to downloading the file.

One aspect provides a computer-implemented method for providing file information to a client by predicting characteristics of a computer file. Embodiments of the method comprise receiving a file information request from a client, where the file information request identifies a uniform resource locator (URL) from which the client is attempting to download a file. The method determines stability information for the URL from which the client is attempting to download the file, where the stability information indicates whether the URL provides a same file each time the URL is used. Responsive to the stability information for the URL indicating that the URL is stable, the method provides file information for the file to the client in response to the request.

Another aspect provides a non-transitory computer-readable storage medium storing executable computer program instructions for providing file information to a client. The computer-readable storage medium stores computer program instructions for receiving a file information request from a client, where the file information request identifies a URL from which the client is attempting to download a file. The computer-readable storage medium also stores executable computer program instructions for determining stability information for the URL from which the client is attempting to download the file, where the stability information indicates whether the URL provides a same file each time the URL is used. Responsive to the stability information for the URL indicating that the URL is stable, the file information for the file is provided to the client in response to the request.

Still another aspect provides a computer system for providing file information to a client. The system comprises a non-transitory computer-readable storage medium storing executable computer program modules including a stability information module, an analysis module and a reporting module. The stability information module is for receiving a file information request from a client, where the file information request identifies a URL from which the client is attempting to download a file. The analysis module is for determining stability information for the URL from which the client is attempting to download the file, where the stability information indicates whether the URL provides a same file each time the URL is used. The reporting module is for providing the file information for the file to the client responsive to the stability information for the URL indicating that the URL is stable.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
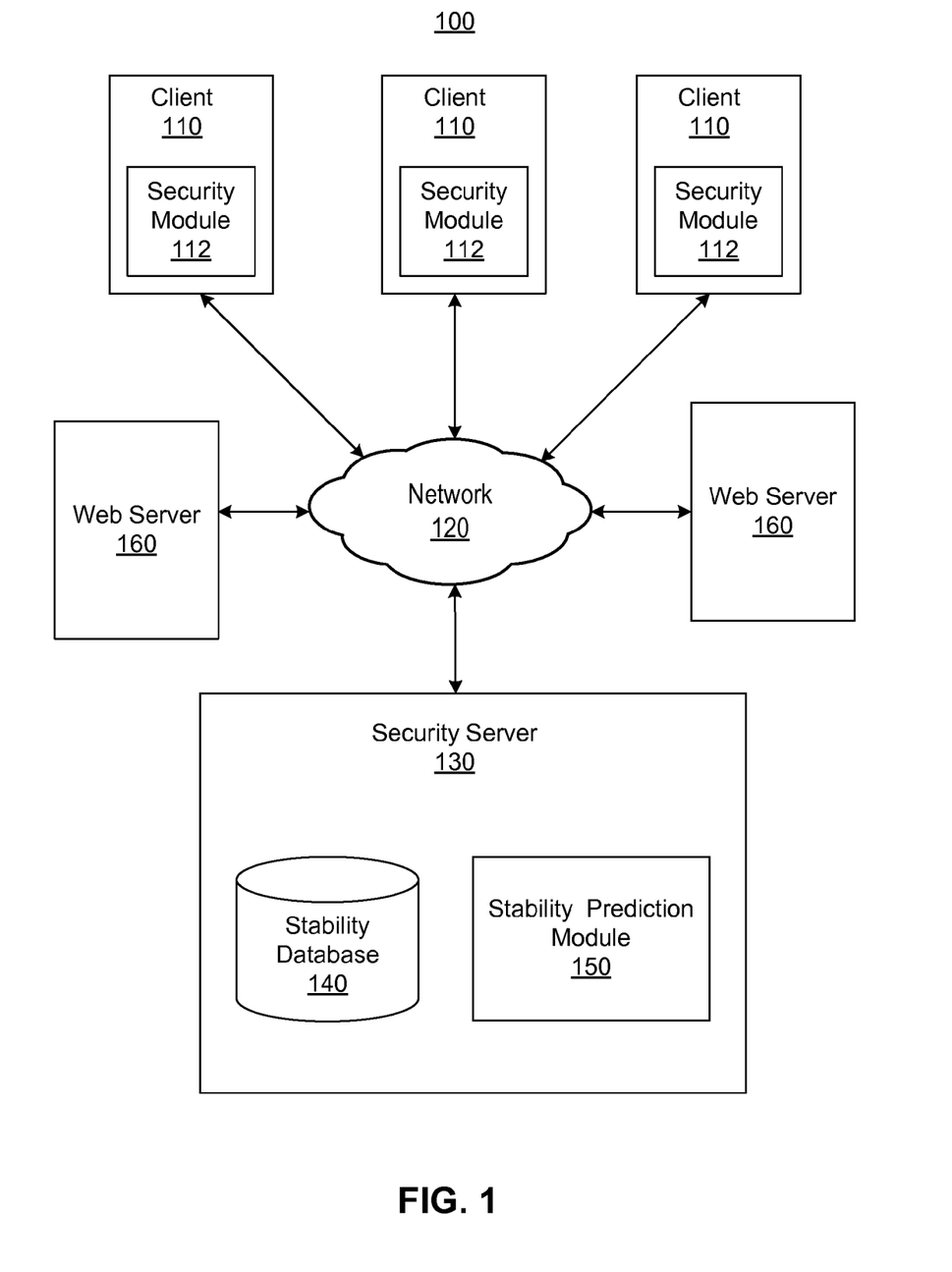
FIG. 1 is a high-level block diagram of a computing environment for predicting the stability of uniform resource locators (URLs) according to one embodiment.

FIG. 1 is a high-level block diagram of a computing environment 100 for predicting the stability of uniform resource locators (URLs) according to one embodiment. FIG. 1 illustrates a security server 130, two web servers 160 and three clients 110 connected by a network 120. The illustrated environment 100 represents a typical computing environment where the security server 130 predicts the stability of given URLs. Only three clients 110, two web servers 160, and one security server 130 are shown in FIG. 1 in order to simplify and clarify the description. Embodiments of the computing environment 100 can have many clients 110, security servers 130 and web servers 160 connected to the network 120.

The web servers 160 provide content including one or more web pages to clients 110, the security server 130, and other entities on the network 120. In one embodiment, a web server 160 serves a web page containing a link that can be selected to download a file. The link references an associated URL identifying the location from which the file is to be downloaded. The URL includes a domain name (or IP address) identifying the destination location for the URL and a path specifying the location of the requested file at the destination location. The URL may also include other information, such as a query string, scheme name, and port number. The file downloaded using the link may include executable content such as an installer for a software application.

A client 110 is used by a user to browse websites hosted by the web servers 160 on the network 120, as well as to interact with the security server 130, and/or other entities on the network. In one embodiment, the client 110 is a personal computer (PC) such as a desktop, notebook, or tablet computer. In other embodiments, the client 110 is a mobile telephone, personal digital assistant, television set-top box, or other electronic device.

In one embodiment, a user uses the client 110 to download a file from a web server 160. For example, the user may use a browser select a "download" link on a web page of a website hosted by a web server 160. Selecting the link causes the browser to initiate a download of a file from the location specified by the URL associated with the link.

The client 110 executes a security module 112 for protecting the client from malicious software (malware) and other threats. Depending upon the embodiment, the security module 112 may be a standalone application or integrated into the operating system or other software executing on the client 110. In addition, the security module 112 may be located apart from the client 110, such as within a proxy server that monitors network communications involving the client.

In one embodiment, the security module 112 monitors actions being performed by software executing on the client 110 and detects the initiation of a file download from a web server 160. The security module 112 may temporarily suspend the download to provide the security module with time to analyze the download. While the download is suspended, the security module 112 determines the URL of the file being downloaded and sends a file information request identifying the URL to the security server 130. The security module 112 may also provide other information to the security server 130, such as a unique identifier of the client 110 and a timestamp.

If the URL is stable, the security module 112 receives file information describing the file that the client 110 is attempting to download. In general, a URL is "stable" if it tends to provide the same file each time a file is downloaded using the URL. Thus, the stability of a URL reflects the likelihood that the file being downloaded from the specified URL is the same as other files previously downloaded using the same URL. A URL is said to be "unstable" if the file downloaded from the URL changes frequently. Said another way, the stability of a URL represents a prediction of whether the file the client 110 is attempting to download using the URL is the same file other clients have downloaded using the same URL.

The file information that the security module 112 may receive from the security server 130 includes a hash and/or other identifier of a file predicted to be downloaded using the URL. The file information may also include reputation information for the file. The reputation information may indicate, for example, the likelihood that the file contains malware, the impact the file is likely to have on the performance of the client 110, the number of other clients 110 that have downloaded the file, and other characteristics of the file. The file information may also identify alternative websites that provide the same file and alternative files that perform similar functions to the file (e.g., alternatives to an application the user is attempting to download).

The security module 112 may present the file information to the user of the client 110 prior to the client downloading the file. The user may use the reputation information to evaluate whether the file is a worthwhile download prior to expending the resources to actually download the file. If the user decides to download the file, the security module 112 resumes the download of the file to the client 110. If the user decides not to download the file, the security module 112 interacts with the browser to cancel the file download.

The security module 112 may present the file information (e.g., the reputation information) to the user by modifying the display of the web page on which the link to the file appears. This modification may occur before the user selects the link to download the file. For example, the security module 112 may detect that the user has browsed to a web page having URLs embedded in it. The security module 112 may then determine whether the URLs in the web page provide stable file downloads. If so, the security module 112 may modify the web page to present the file information for the files that can be downloaded using the URLs. To this end, the security module 112 may change the color of the text for the link or URL in the web page to green for links that download files with good reputations and red for links that download files with bad reputations. The security module 12 may also remove any URLs identified as providing stable file downloads to files having bad reputations from the web page and thereby prevent the user from selecting the links to such files.

If the file is downloaded to the client 110, the security module 112 may send a downloaded file report describing the downloaded file to the security server 130. This report includes a hash or other unique identifier of the file and the URL from which the file was downloaded. The downloaded file report may also include observed reputation information for the file. For example, the downloaded file report may indicate an identity of an installer present in the file, strings within executable components within the file, components installed on the client 110 by the file, system settings and configuration changes made by the file, version numbers and application language settings. The reputation information may indicate an amount of malware installed by the file on the client 110, computer processing unit (CPU) utilization by the file, disk space consumed by the file, and impact on start-up time of the client by the file. Depending upon the embodiment, the security module may send a downloaded file report each time a file is downloaded or only in certain circumstances, such as when the identifier of the downloaded file does not match the identifier in the file information received from the security server 130.

The security server 130 interacts with the clients 110 via the network 120 to receive file information requests and downloaded file reports, and to provide file information to the clients. The security server 130 includes one or more computers executing modules for providing the functionality described herein. Depending on the embodiment, one or more of the functions of the security server 130 can be provided by a cloud computing environment. As used herein, "cloud computing" refers to a style of computing in which dynamically scalable and often virtualized resources are provided as a service over the network 120. Functions attributed to the clients 110 can also be provided by the cloud computing environment.

In one embodiment, the security server 130 executes a stability prediction module 150 and includes a stability database 140. The stability database 140 stores information used by the security server 130 to perform its functions. In one embodiment, the stability database 140 stores data describing stability information for URLs. The stability information represents the stability of a URL as a stability score. The stability score may be a binary value (e.g., "0" for unstable and "1" for stable), a continuous numeric value (e.g., ranging between 0 and 1), or a descriptive value (e.g., "good" or "bad"). The stability database 140 also stores file information about the files downloaded by the clients 110 and/or by other sources. In addition, the stability database 140 may also store other information about the clients 110, web servers 160, and files. This other information may include, for example, information derived from downloaded file reports received from the clients 110 and the actual reports.

The stability database 140 may organize the stored information in a variety of ways. In one embodiment, the stability database 140 stores the stability information as a triplet of (stability information, URL, file identifier), where the file identifier identifies the file downloaded from the URL, and the stability information includes the stability score for the URL. This organization allows the stability information for a URL to be retrieved by searching for the URL, the file identifier, or the combination of both. In addition, the stability database 140 may store the file information for a file in association with the file's identifier.

The stability prediction module 150 receives file information requests from the security modules 112 of clients 110 and replies with file information in response to the requests. As mentioned above, a file information request received from a client 110 includes the URL from which the client 110 is attempting to download a file. The stability prediction module 150 determines the stability of the URL. If the URL is stable, the stability prediction module 150 retrieves the file information for the file provided by the URL from stability database 140. The stability prediction module 150 sends the retrieved information to the client 110 in response to the request. The stability prediction module 150 may also provide other information to security modules 112 of clients 110, such as the stability information for the received URLs.

The network 120 enables communications among the clients 110, the security server 130 and the web servers 160 and can comprise the Internet as well as mobile telephone networks. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
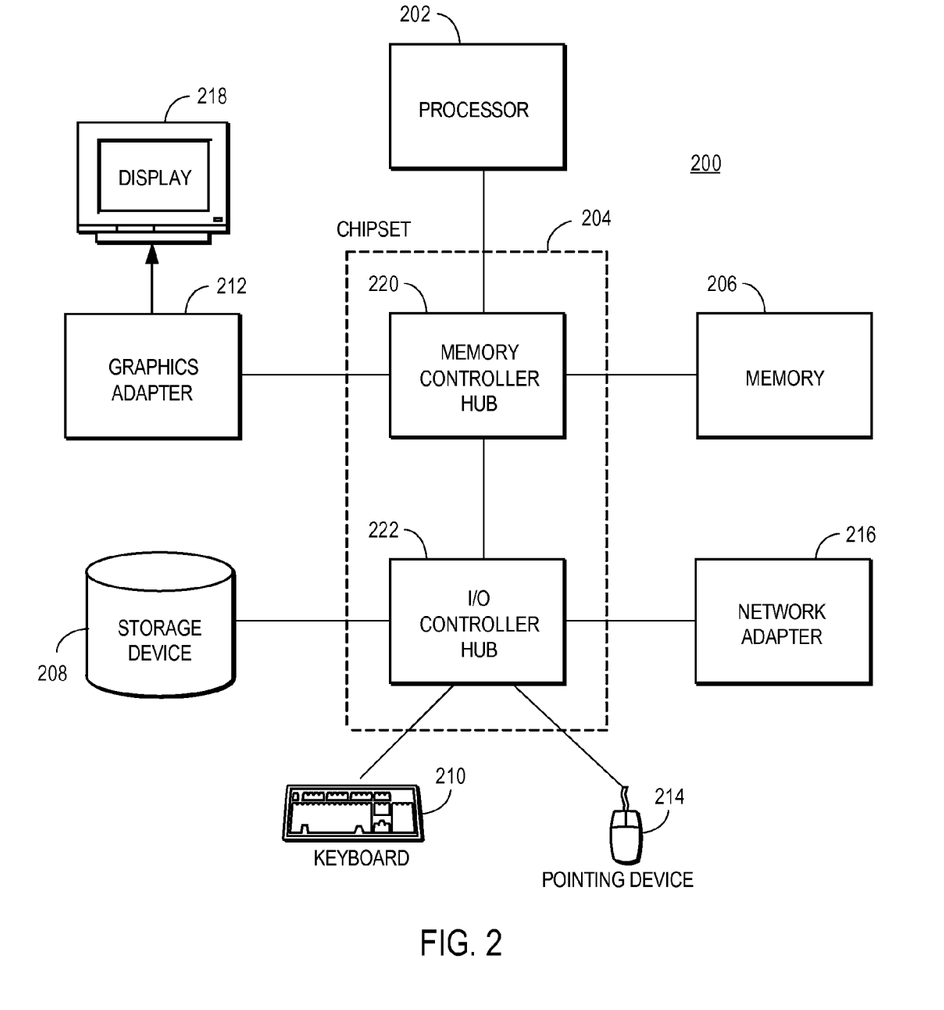
FIG. 2 is a high-level block diagram of a computer for acting as a client and/or security/web server according to one embodiment.

FIG. 2 is a high-level block diagram of a computer 200 for acting as a client 110, security server 130 and/or web server 160 in one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a security server 130 or a web server 160 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
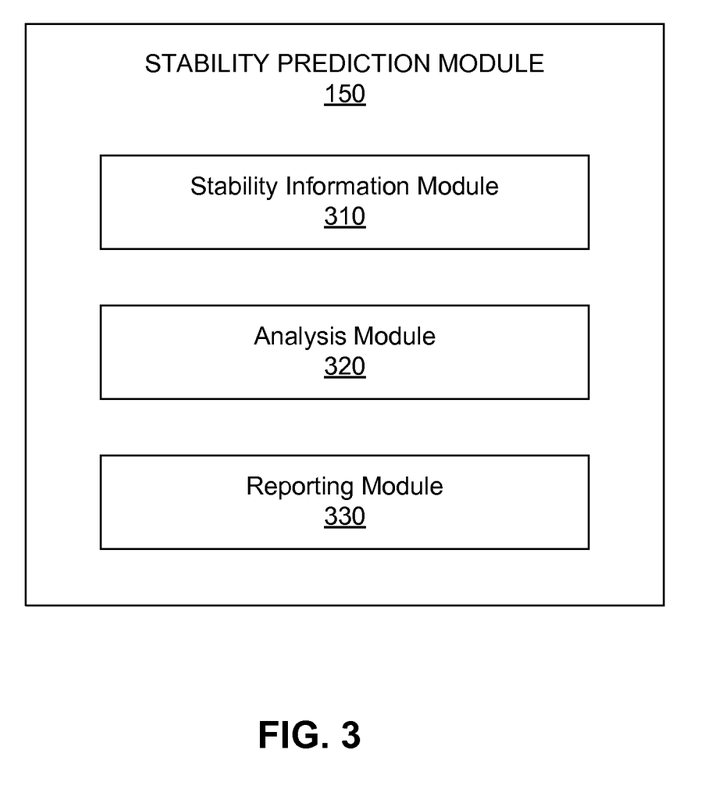
FIG. 3 is a high-level block diagram illustrating a detailed view of a stability prediction module according to one embodiment.

FIG. 3 is a high-level block diagram illustrating a detailed view of the stability prediction module 150 according to one embodiment. As shown in FIG. 3, the stability prediction module 150 includes stability information module 310, an analysis module 320 and a reporting module 330. Those of skill in the art will recognize that other embodiments of the stability prediction module 150 can have different and/or other modules than the ones described here, and that the functionalities can be distributed among the modules in a different manner.

The stability information module 310 receives file information requests from the clients 110. Upon receiving a file information request, the stability information module 310 identifies the URL from which the client 110 is attempting to download a file and determines whether there is stability information for the URL in the stability database 140. If there is stability information for the URL, the stability information module 310 retrieves the information from the stability database 140 and uses the stability score to evaluate whether the URL is stable. For example, this evaluation may compare the stability score for the URL to a threshold and declare the URL stable based on the comparison.

If the URL is stable, the stability information module 310 obtains the file information for the file provided by the URL from the stability database 140, and instructs the reporting module 330 to report the file information to the client 110. If the URL is not stable, or stability information is unavailable for the URL, an embodiment of the stability information module 310 instructs the reporting module 330 to inform the client 110 that the stability for the URL is unknown.

The analysis module 320 determines stability information for URLs that clients 110 use to download files from web servers 160 and stores this information in the stability database 140. In one embodiment, the analysis module 320 analyzes the file identifiers and URLs received in downloaded file reports received from the clients 110. This analysis reveals whether the files that clients 110 download using a given URL tend to be the same or different. The analysis module 320 derives the stability information for the URL based on this tendency. Thus, if the analysis of the downloaded file reports reveals that many clients 110 have downloaded the same file from a particular URL, the analysis module 320 assigns the URL stability information indicating a high degree of stability. Conversely, if the analysis reveals that the clients 110 have downloaded many different files using the same URL, the analysis module assigns the URL a stability score indicating a low degree of stability.

Certain URLs may provide a limited set of different files. For example, a URL may provide different language-versions of a same file. Since the file identifiers for the different-language versions are different, the analysis module 320 would determine that the URL is unstable. To account for this situation, an embodiment of the analysis module 320 determines the number of different files provided by a URL, and may generate stability information indicating that the URL is stable if the number of different files is below a threshold or meets other criteria. In addition, the analysis module 320 may aggregate or otherwise associate the file information for the set of files provided by the URL. For example, the analysis module 320 may indicate that the reputation information for the files in the set should be combined (e.g., averaged). Thus, the reputation information reported to a user contemplating downloading a file from the URL is a combination of the reputations of the multiple files provided by the URL.

In addition, different files provided by a URL may have only minor differences that cause the stability information to indicate that the URL is unstable. For example, the files provided by the URL may include a software application that contains different license agreements for users in different regions, even though the application is the same for all users. To account for this issue, an embodiment of the analysis module 320 performs a deep inspection of the file provided by the URL to determine whether components within the file are stable. For example, the analysis module 320 may use the URL to download different versions of the file directly from the web server 160, and then parse the file into its separate internal components. Similarly, the downloaded file reports received from the clients 110 may include file identifiers (e.g., hashes) for individual components of the downloaded file. The analysis module 320 may base the stability information for the URL on the stability of one or more components within the downloaded file, rather than on the file as a whole.

The stability information for a URL may change over time. Thus, an embodiment of the analysis module 320 continues to analyze downloaded file reports and updates stability information for a URL on an ongoing basis. The degree to which new downloaded file reports influence existing stability information for a URL is a configurable design parameter. Frequency and/or time thresholds can be used to differentiate stable from unstable URLs. The stability information for a URL may be based on the last N reports received for the URL, where N is an integer such as 100 or 1000. Similarly, the stability information may be based on downloaded file reports received within a specified time period, such as the previous hour. For example, a URL may be considered stable if there have been at least 100 downloads of the same file from the URL in the last hour. Older downloaded file reports may be discounted entirely, or given weights that decay over time and/or as more reports are received.

To check the continued stability of a URL, the analysis module 320 can selectively instruct clients 110 to download files without using the stability information. For example, on every $10^{th}$ query for a particular URL from a client 110, the analysis module 320 can instruct the client to download the file and to send the downloaded file report for the downloaded file to the security server 130 for subsequent analysis. If the identifier of the downloaded file does not match identifiers of files downloaded by other clients from the same URL, the analysis module 320 determines that the URL is no longer stable.

By continuing to check the stability of the URL over time, the analysis module 320 can detect if a URL remains stable even though it has switched from providing a first file to a second file. For example, the same URL may reliably provide a first file for a span of time and then switch to provide a second file for another span of time. In this scenario, the URL is stable even though it is associated with two files. By continuing to update the stability information, the analysis module 320 detects the URL's transition from the first file to the second file, and quickly identifies that the URL is again stable after the transition.

In one embodiment, the analysis module 320 bases the stability information at least in part on results of a textual analysis of the URL. Some patterns of text appearing in a URL may indicate that the URL is always stable or always unstable. For example, analysis of downloaded file reports may indicate that the pattern "foo.com/images/*.jpg" found in a URL always indicates that the URL is stable or unstable. This information can be used to update the stability information for the URL.

The analysis module 320 may be unable to generate stability information for a URL. For example, if the URL is new, there might not be enough downloaded file reports from the clients 110 or other sources to accurately generate stability information. In such a scenario, an embodiment of the analysis module 320 waits until enough downloaded file reports have been received to generate the stability information.

The reporting module 330 reports file information to requesting clients 110. As mentioned above, an embodiment of the reporting module 330 receives instructions from the stability information module 310 indicating when and what information to report. If a client 110 is requesting file information for a stable URL, the reporting module 330 provides the requested information. If the URL is not stable, the reporting module 330 may instruct the requesting client 110 to download the file from the URL and submit a downloaded file report, and/or instruct the client to resubmit the stability information request at a later time.

Figure 4:
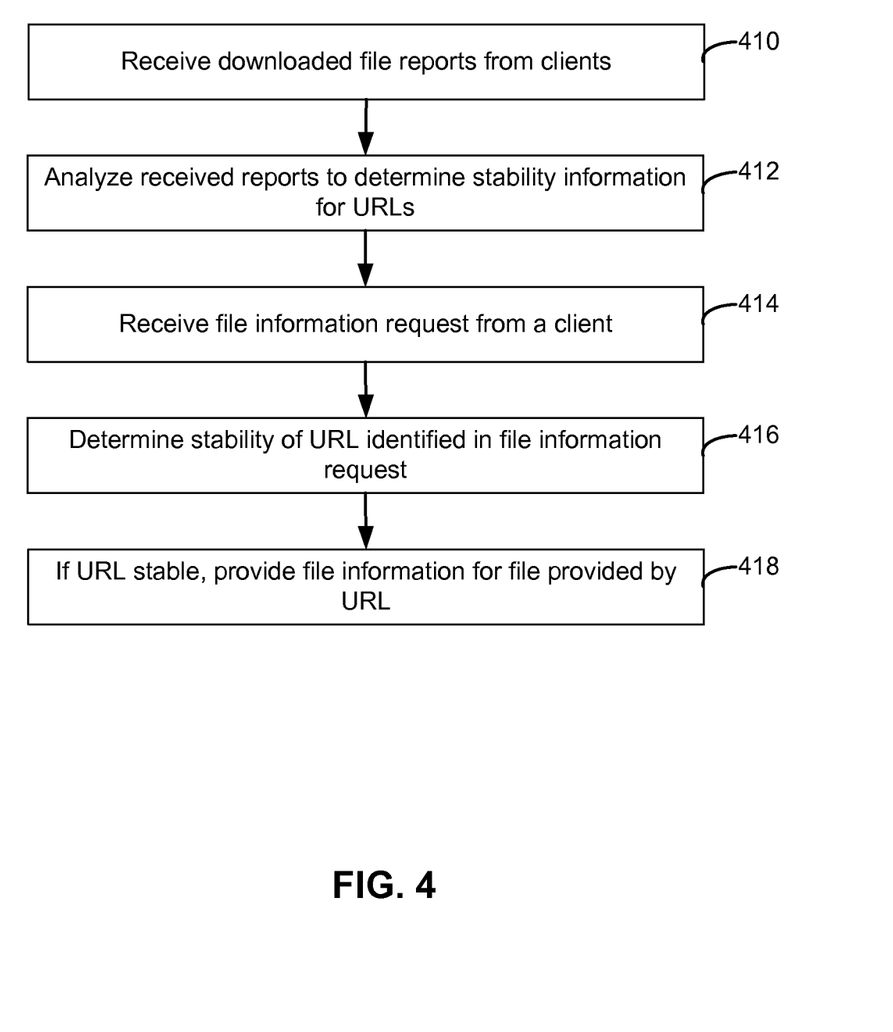
FIG. 4 is a flowchart illustrating steps performed by the security server according to one embodiment.

FIG. 4 is a flowchart illustrating steps performed by the security server 130 according to one embodiment. Other embodiments perform the illustrated steps in different orders, and/or perform different or additional steps. Moreover, some of the steps may be performed by modules other than the security server 130.

The security server 130 receives 410 downloaded file reports from security modules 112 of clients 112. A downloaded file report includes a unique identifier of a file and the URL of a web server 160 from which the file was downloaded. The security server 130 may receive many of these reports over time as multiple different clients download files from many different URLs.

The security server 130 analyzes 412 the downloaded file reports to determine stability information for URLs identified in the reports. In general, this analysis 412 determines whether a given URL tends to provide the same file each time a client 110 uses the URL to download a file. The stability information includes a stability score with a value that describes the stability of the associated URL. The analysis may involve a variety of factors, such as whether the stability of a URL changes over time, a textual analysis of the URL, whether the URL provides a limited set of files, and whether the files provided by the URL have only minor differences. The security server 130 stores the stability information in a stability database 140.

The security server 130 receives 414 a file information request from a client 110. This request may be received from a security module 112 in the client 110 that detects the initiation of a file download at the client. The file information request identifies the URL from which the client 110 is attempting to download a file. In response to the file information request, the security server 130 determines 416 the stability of the identified URL in the request.

If the identified URL is stable, the security server 130 provides 418 file information for the file provided by the URL. The file information may include reputation information for the file that indicates, for example, the likelihood that the file contains malware and the impact that the file is likely to have on the performance of the client 110. A user of the client 110 can review the file information and decide whether to expend the resources to download the file.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of providing file information to a client, comprising:
   receiving a file information request from a client, the file information request identifying a uniform resource locator (URL) from which the client is attempting to download a file;
   determining stability information for the URL from which the client is attempting to download the file, the stability information indicating whether the URL provides a same file each time the URL is used, wherein determining stability information for the URL comprises:
      receiving downloaded file reports from a plurality of clients, the downloaded file reports identifying URLs and files downloaded from the URLs by the clients; and
      analyzing the received downloaded file reports to determine stability information for the URLs, wherein the URL is determined to be stable responsive to the downloaded file reports indicating that the URL has provided the same file to the plurality of clients; and
   responsive to the stability information for the URL indicating that the URL is stable, providing file information for the file to the client in response to the request.

2. The method of claim 1, wherein determining stability information for the URL comprises:
   determining whether the URL has provided the same file to a plurality of clients; and
   responsive to determining that the URL has provided the same file to a plurality of clients, generating stability information indicating that the URL is stable.

3. The method of claim 2, further comprising:
   identifying files provided by the URL to the plurality of clients during a specified time period; and
   generating the stability information responsive at least in part to whether the URL provided the same file to the plurality of clients during the specified time period.

4. The method of claim 1, wherein the client is adapted to present the file information to a user of the client by modifying a display of a web page in which the URL appears.

5. The method of claim 1, wherein determining stability information for the URL comprises:
   identifying a number of different files provided to a plurality of clients by the URL;
   determining stability information indicating that the URL is stable responsive to the number of different files provided by the URL being below a threshold.

6. The method of claim 1, wherein determining stability information for the URL comprises:
   identifying different files provided to a plurality of clients by the URL;
   parsing the different files into a plurality of internal components of the files; and
   determining the stability information for the URL responsive to stability of the internal components of the files.

7. The method of claim 1, wherein the provided file information comprises reputation information indicating a likelihood that the file contains malware, wherein the reputation information is generated based on downloaded file reports received from a plurality of clients, and the downloaded file reports include observed reputation information for files downloaded by the plurality of clients.

8. A non-transitory computer-readable storage medium storing executable computer program instructions for providing file information to a client, the computer program instructions comprising instructions for:
   receiving a file information request from a client, the file information request identifying a uniform resource locator (URL) from which the client is attempting to download a file;
   determining stability information for the URL from which the client is attempting to download the file, the stability information indicating whether the URL provides a same file each time the URL is used, wherein determining stability information for the URL comprises:
      receiving downloaded file reports from a plurality of clients, the downloaded file reports identifying URLs and files downloaded from the URLs by the clients; and
      analyzing the received downloaded file reports to determine stability information for the URLs, wherein the URL is determined to be stable responsive to the downloaded file reports indicating that the URL has provided the same file to the plurality of clients; and
   responsive to the stability information for the URL indicating that the URL is stable, providing file information for the file to the client in response to the request.

9. The computer-readable storage medium of claim 8, wherein the computer program instructions for determining stability information for the URL comprise instructions for:
   determining whether the URL has provided the same file to a plurality of clients; and
   responsive to determining that the URL has provided the same file to a plurality of clients, generating stability information indicating that the URL is stable.

10. The computer-readable storage medium of claim 9, further comprising computer program instructions for:
   identifying files provided by the URL to the plurality of clients during a specified time period; and
   generating the stability information responsive at least in part to whether the URL provided the same file to the plurality of clients during the specified time period.

11. The computer-readable storage medium of claim 8, wherein the computer program instructions for determining stability information for the URL comprise instructions for:
   performing a textual analysis of the URL; and
   determining stability information basing at least in part on results of the textual analysis.

12. The computer-readable storage medium of claim 8, wherein the computer program instructions for determining stability information for the URL comprise instructions for:
   identifying a number of different files provided to a plurality of clients by the URL;
   determining stability information indicating that the URL is stable responsive to the number of different files provided by the URL being below a threshold.

13. The computer-readable storage medium of claim 8, wherein the computer program instructions for determining stability information for the URL comprise instructions for:
   identifying different files provided to a plurality of clients by the URL;
   parsing the different files into a plurality of internal components of the files; and
   determining the stability information for the URL responsive to stability of the internal components of the files.

14. The computer-readable storage medium of claim 8, wherein the provided file information comprises reputation information indicating a likelihood that the file contains malware.

15. A system for providing file information to a client, the system comprising:
   a non-transitory computer-readable storage medium storing executable computer program modules comprising:
      a stability information module for receiving a file information request from a client, the file information request identifying a uniform resource locator (URL) from which the client is attempting to download a file;
      an analysis module for determining stability information for the URL from which the client is attempting to download the file, the stability information indicating whether the URL provides a same file each time the URL is used, wherein
         determining stability information for the URL comprises:
            receiving downloaded file reports from a plurality of clients, the downloaded file reports identifying URLs and files downloaded from the URLs by the clients; and
            analyzing the received downloaded file reports to determine stability information for the URLs, wherein the URL is determined to be stable responsive to the downloaded file reports indicating that the URL has provided the same file to the plurality of clients;
      a reporting module for providing file information for the file to the client in response to the request responsive to the stability information for the URL indicating that the URL is stable; and
   a processor for executing the computer program modules.

16. The system of claim 15, wherein the analysis module is further for:
   determining whether the URL has provided the same file to a plurality of clients; and
   responsive to determining that the URL has provided the same file to a plurality of clients, generating stability information indicating that the URL is stable.

17. The system of claim 15, wherein the analysis module is further for:
   identifying files provided by the URL to the plurality of clients during a specified time period; and
   generating the stability information responsive at least in part to whether the URL provided the same file to the plurality of clients during the specified time period.

* * * * *